May 27, 1930. R. W. BROWN ET AL 1,759,837
SYSTEM AND APPARATUS FOR TESTING IMPULSES AND IMPULSE DEVICES
Filed June 6, 1928   4 Sheets-Sheet 1
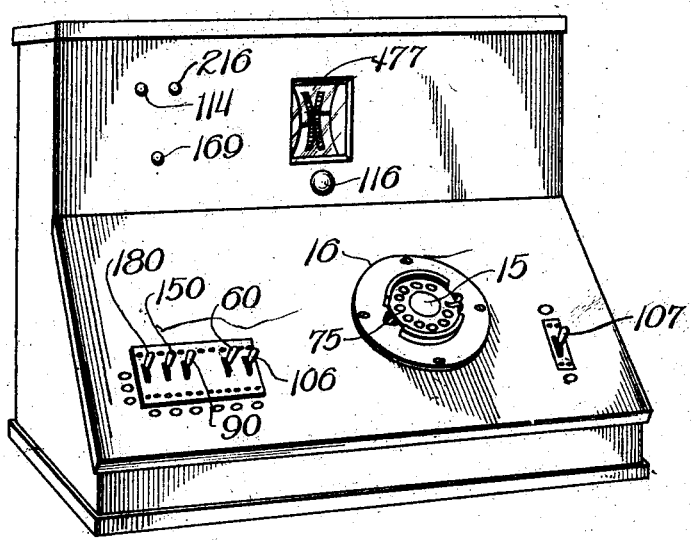
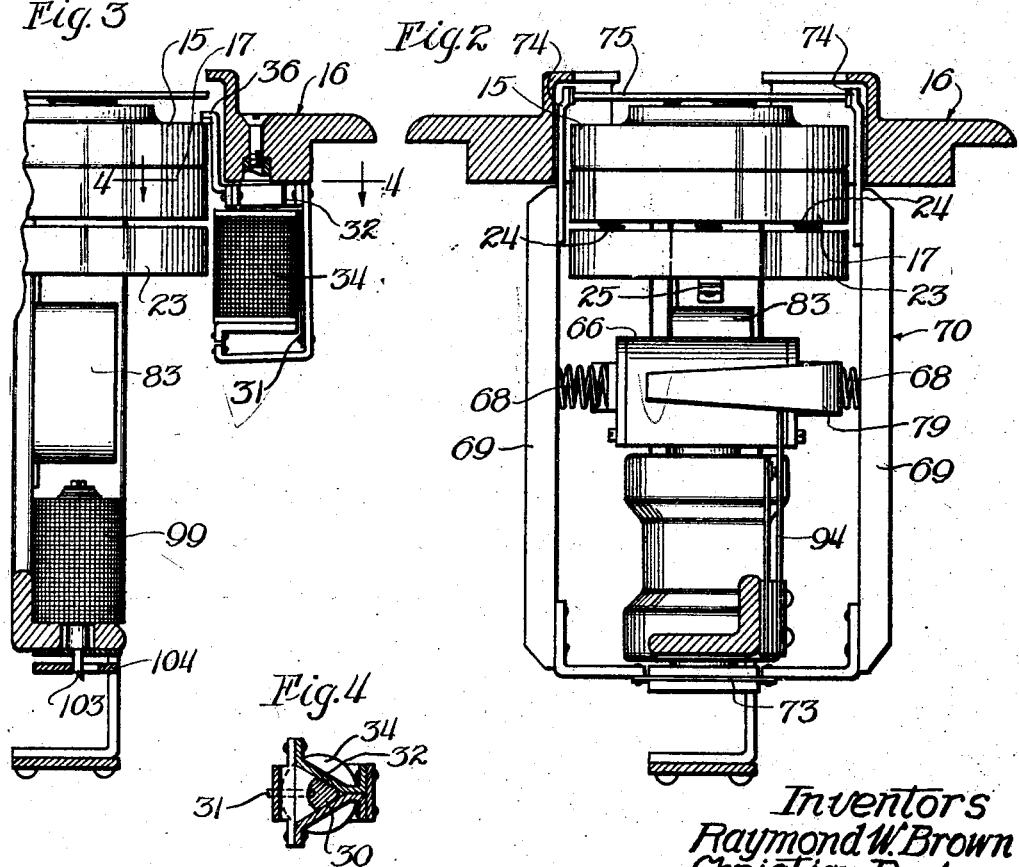
Inventors
Raymond W. Brown
Christian Paulson
by Nahum Atty.

May 27, 1930.   R. W. BROWN ET AL   1,759,837
SYSTEM AND APPARATUS FOR TESTING IMPULSES AND IMPULSE DEVICES
Filed June 6, 1928   4 Sheets-Sheet 2
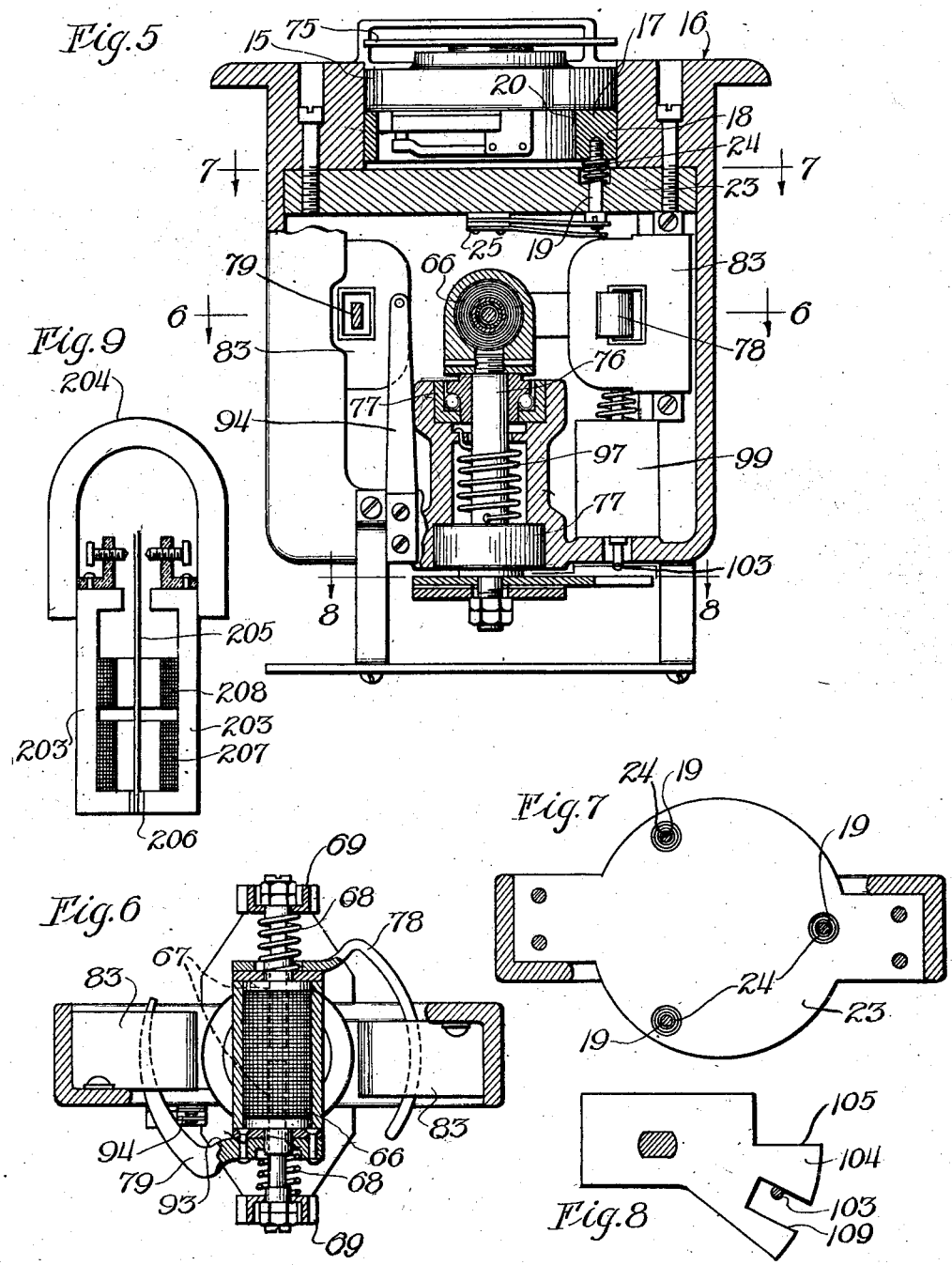
Inventors
Raymond W. Brown
Christian Paulson
by  Atty.

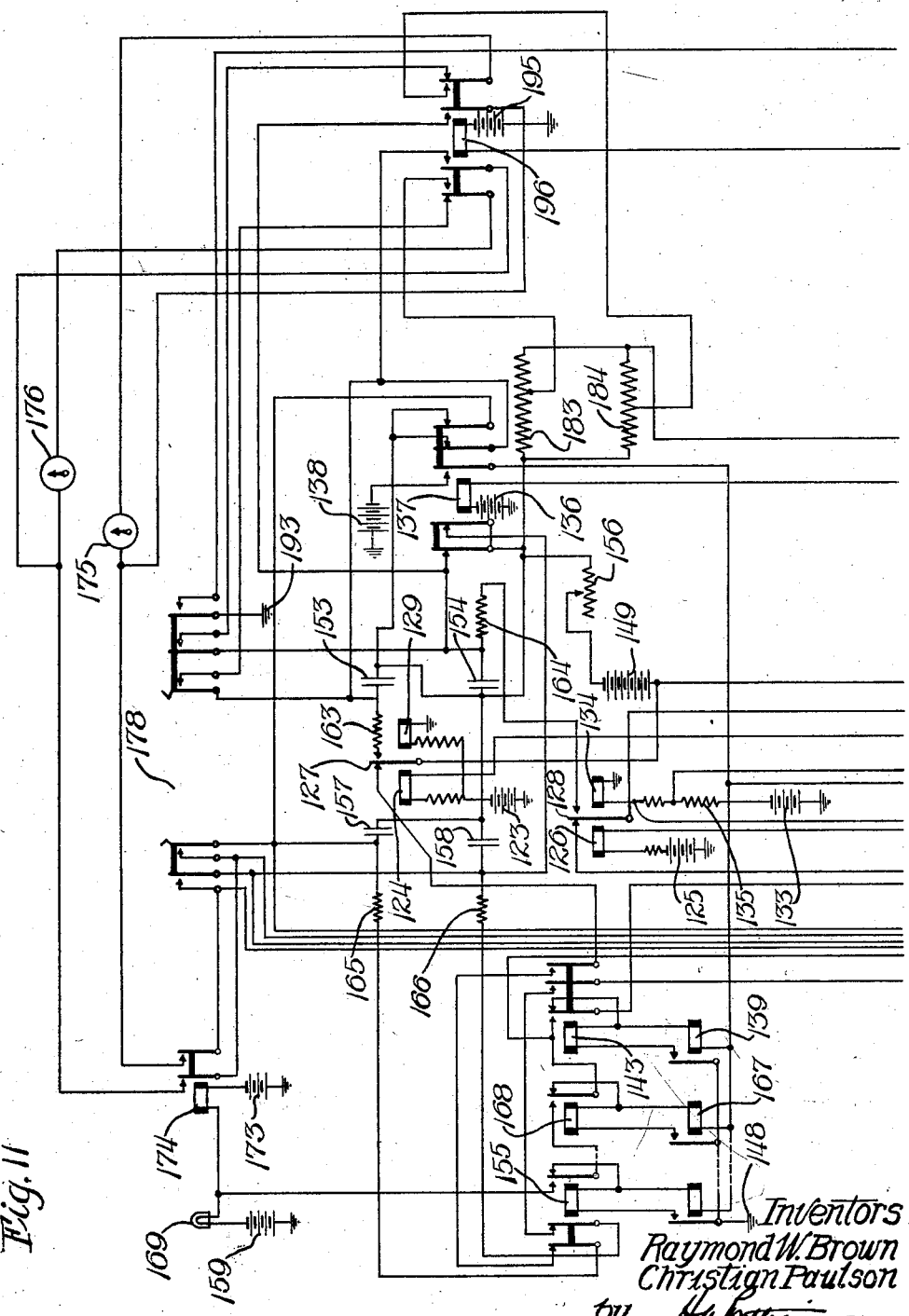

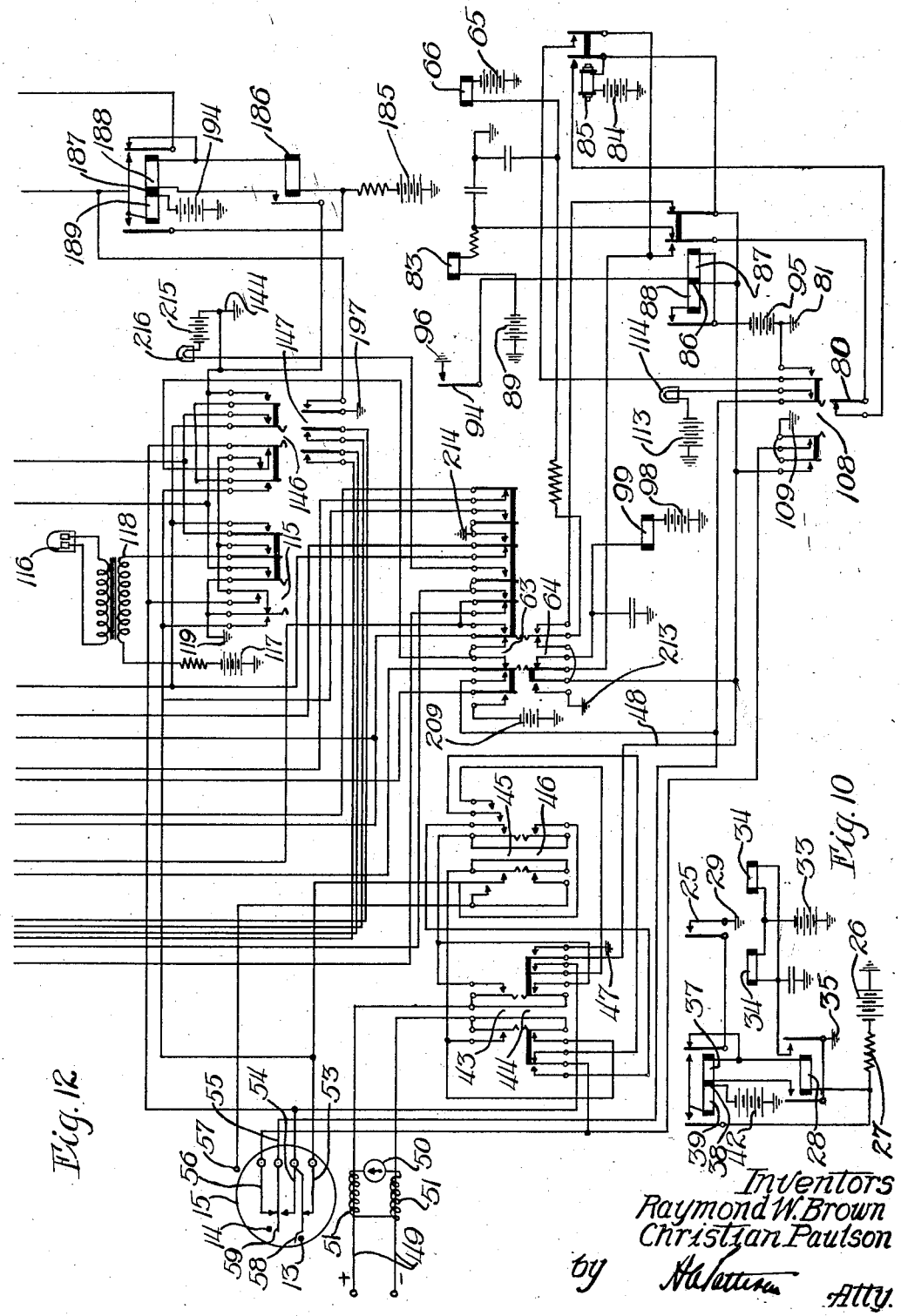

Patented May 27, 1930

1,759,837

UNITED STATES PATENT OFFICE

RAYMOND WICKLUND BROWN AND CHRISTIAN PAULSON, OF CHICAGO, ILLINOIS, ASSIGNORS TO WESTERN ELECTRIC COMPANY, INCORPORATED, OF NEW YORK, N. Y., A CORPORATION OF NEW YORK

SYSTEM AND APPARATUS FOR TESTING IMPULSES AND IMPULSE DEVICES

Application filed June 6, 1928. Serial No. 283,232.

This invention relates to a system and apparatus for testing impulses and impulse devices, and more particularly to a system and apparatus for testing the adjustment of impulse transmitting devices, such as dials for automatic telephone systems.

Objects of the invention are to provide a system and apparatus for accurately and efficiently making all of the tests to which an impulse device is subjected to determine its proper adjustment.

In accordance with the general features of the invention, a plurality of condensers are provided, some of which are charged during the impulse period, and others are charged during the interval between impulses so that the resulting ratio of charges on the condensers is a measure of the ratio between the impulses and the intervening intervals, and the value of the charges is a measure of the time elapsed during which the impulses are made, each of which is reflected in associated indicating devices. One embodiment of the invention contemplates in addition to these features, apparatus for testing circuit changes during the travel of the dial, and for testing open contacts to insure that the voltage required for their breakdown exceeds a predetermined value.

It is believed that a complete understanding of the invention may be had by reference to the following description taken in conjunction with the accompanying drawing, in which Fig. 1 is a perspective view of the instrument showing a dial in position to be tested;

Fig. 2 is a cross sectional view of the dial holding device;

Fig. 3 is a cross sectional view, similar to Fig. 2, taken on a slightly different diameter;

Fig. 4 is a plan view taken on lines 4—4 of Fig. 3;

Fig. 5 is a cross sectional view of the dial holding device taken on a diameter 90° displaced from the view shown in Fig. 2;

Fig. 6 is a cross sectional plan view taken on lines 6—6 of Fig. 5;

Fig. 7 is a cross sectional plan view taken on lines 7—7 of Fig. 5;

Fig. 8 is a detail view taken on lines 8—8 of Fig. 5;

Fig. 9 is an elevational view, partly in section, of a relay used in the testing system;

Fig. 10 is a diagrammatic view of the circuit for operating the holding means of the dial holding device, and Figs. 11 and 12 are diagrammatic views of the testing system.

Referring to the drawings, a dial 15 is shown in position in a dial holding device 16. The dial 15 rests upon a member 17 which is provided with an eccentric cylindrical opening 20 to receive a portion of the dial and the member 17 is movably mounted in the cylindrical opening in the dial holding device on a plurality of pins 19 which are slidably located in apertures of a support 23 secured to the dial holding device. The member 17 is held in its uppermost position by a plurality of springs 24 and may be moved downwardly by exerting a pressure upon the dial 15. When the member 17 is depressed, one of the pins 19 operates to close the contacts of a switch 25, and upon the closing of the switch (Fig. 10), a current will flow from battery 26 to resistance 27, relay 28 to ground 29, energizing relay 28 to close its normally open contacts. The closing of the contacts of relay 28 allows a current to flow from battery 33 to holding magnets 34—34, to ground 35, energizing the holding magnets 34, magnetizing cores 30 and causing V-shaped armatures 32 to engage clamping members 36 against the action of springs 31 with the dial to firmly hold the dial in position. Only one of the holding magnets 34 is shown in Figs. 3 and 4. The other holding magnet is diametrically opposed in the dial holding device and is identical with the one illustrated. The V-shaped armatures are made of any suitable magnetizing material and the clamping members 36 are made of non-magnetic material so as not to interfere with the operation of the armatures. By making the armatures V-shaped a considerable range of travel is obtained for a comparatively narrow air gap between the armatures and the cores 30. In order to compel the armatures to travel in a straight line a pin 31 is mounted on each of the cores 30 which passes through an aperture in the associated clamping member. The switch 25 remains closed only as long as a pressure is exerted upon the dial and when the pressure is released switch 25 will open and remove the ground 29. With the ground 29 removed and the contacts of the relay 28 closed, a coil 37 of relay 38 will be energized from the battery 26, through relay 28, coil 37 to ground 35, causing the contacts of relay 38 to close. The closing of contacts of relay 38 causes the energization of coil 39 from battery 42 to ground 35, over the same path as the current from battery 26, establishing a locking circuit for relay 38. With the contacts of relays 28 and 38 closed, it will be seen that to remove the dial, pressure must be exerted thereon whereby the switch 25 will be operated a second time to shunt the current of battery 26 from the relay 28, through the contacts of relay 38, to ground 29, deenergizing relay 28, and allowing its contacts to open. The contacts of relay 38 will remain closed, however, as long as switch 25 is closed, since the current from battery 42 flows through coil 39 to ground 29. As soon as the switch 25 is reopened during the operation of removing the dial, the relay 38 will be deenergized and the circuit will be in the same condition as it was before the switch 25 was operated the first time all of which will be readily understood as the description progresses.

The operation of the holding device is as follows: When a dial is placed in the holding device, a pressure is exerted thereon closing the switch 25 and causing the holding magnets 34 to be energized to move the holding members 36 into engagement with the dial and hold the dial in place. Upon a second depression of the dial, the holding magnets will be deenergized releasing the holding members 36 and allowing the dial to be removed.

When a dial has been placed in position in the dial holding device, it may be subjected to various tests and the apparatus by which the breakdown test is applied will be described first. The breakdown test consists in applying an electric potential of 500 volts from any suitable source (not shown) through leads 49 to the various contacts in the dial to determine if the contacts are properly insulated so that no current will pass between them. The electrical connections of the dial are shown diagrammatically in Fig. 12.

The dial, as is well known in the art, is a device for transmitting a series of electrical impulses by which a connection is automatically made from one telephone set with another subscriber's set through the operation of suitable electrical devices. This is accomplished by means of a pawl 13 which is caused to reciprocate at a constant speed to operate an impulse key 58. Prior to the operation of the impulse key 58, another pawl 14 operates a shunt switch 59 for the purpose of disconnecting the telephone receiver from the line during the impulses to prevent the clicking noise which would result in the receiver from the impulses.

In applying the breakdown voltage to the contacts of the dial 15, switches 43 and 45 are simultaneously operated, applying a positive potential on contacts 55 and 56 and a negative potential on contacts 53 and 54 and on a frame contact 57. It will be understood that the negative and positive signs on the leads 49 are used for purposes of illustration and are to be considered when using alternating current as instantaneous potentials which will bear the same relation to each other when reversed. If there is no leakage current passing between the contacts on the dial, due to poor insulating or metal clips, switch 43 is maintained operated and switch 45 is opened and switch 46 is closed, applying a negative potential to the frame 57 and a positive potential to the contacts 53 and 54. This completes the breakdown test for the dial in its normal position. In order to apply the breakdown voltage on the contacts of the dial normally closed switches 44 and 45 are operated which applies the breakdown voltage and at the same time causes impulse key 58 and shunt switch 59 to open as to be hereinafter more fully described.

The operation of the switch 44 connects conductor 48 to ground 47, allowing a current to flow from battery 65 through a clamping magnet 66, switch 64, conductor 48 to ground 47. The energization of the clamping magnet 66 serves to operate a pair of plungers 67 which are normally held spaced apart by springs 68. The plungers 67 are attached to a pair of clamping arms 69 which are pivotally mounted on a dialing wheel rotating mechanism 70 of the dial holding device 16 by a flexible leaf spring 73. The upper portion of each of the arms 69 is provided with a clamping member 74 which is adapted to engage a dialing wheel 75 of the dial 15 when the clamping magnet 66 actuates the arms 69. The clamping magnet 66 and the arms 69 are carried by a shaft 76 (Fig. 5) which is rotatably mounted in bearings 77. Mounted upon the housing of the electromagnet 66 and rotatable therewith are a pair of armatures 78 and 79 which are adapted to be rotated upon the energization of rotating magnets 83 stationarily mounted upon the frame of the dial holding device 16. Subsequent to the operation of the clamping magnet 66 which causes the clamping member 74 to engage the dialing wheel 75 a retarded relay 85 is operated by a battery 84 which is also connected to ground 47 upon the operation of switch 44. Upon the closing of the contacts of relay 85, a current will flow from battery 89, through the rotating magnets 83, to the contacts of relay 86, switch 80, relay 85 to ground 47, energizing the rotating magnets 83 to actuate the armatures 78 and 79. The armature 78 is made of a uniform cross section and is therefore effective only at the beginning of its rotary movement. The armature 79 on the other hand is made of a constantly increasing cross section and will therefore continue its rotative effect to cause a rotation of the dialing wheel 75 until a shoulder 93 of the armature engages a switch 94. The closing of the switch 94 allows a current to flow from battery 95, through a coil 87 of relay 86, to ground 96, operating the relay 86 to break the circuit through the rotating magnets 83 and closing a locking circuit from battery 95 through a coil 88 of the relay 86 to ground 47. As soon as the rotating magnets 83 are deenergized, a spring 97 tends to return the dialing wheel rotating mechanism to its normal position. However, when the relay 86 is operated, a circuit is established from battery 98 to an electromagnet 99, switch 64, relay 86, switch 80, relay 85 to ground 47, causing electromagnet 99 to move a plunger 103 into the path of a toothed plate 104 which is attached to and rotates with the dialing wheel rotating mechanism. A surface 105 of the plate 104 will engage the plunger 103, tending to hold the dialing wheel 75 in such a position that the impulse key will be open and the shunt switch 59 will be in its operative position. The above action takes place substantially instantaneously so that when the switches 44 and 46 are operated the clamping arms 69 will engage the dialing wheel and rotate it, allowing it to come back against the plunger 103, holding the dialing wheel in the operative position while a positive potential is applied to the contacts 54 and 56 and a negative potential is applied to the contacts 53 and 57. The breakdown of any of the open contacts or gaps during the test results in an alternating current flowing in the line 49 which condition is indicated in an indicating device 50 (Fig. 12). The indicating device is associated with the line 49 by means of a pair of series transformers 51—51 having a high resistance primary to limit the current upon a breakdown and connected in series to have a cumulative effect on the indicating device. In this way a current from either side of the line 49 to ground will be reflected in the indicating device. This completes the breakdown test. While the breakdown voltage has been spoken of as an alternating current voltage, it will be readily seen that direct voltage may be used equally well in which case the indicating device 50 is replaced by any suitable indicating means operable on direct current.

The switches 43 and 44 may be operated by a single key 106 (Fig. 1) which may be arranged to operate one of the switches upon a forward movement, and the other switch upon a backward movement of the key 106, thereby preventing the switches from being operated simultaneously. In a similar manner switches 45 and 46 may be operated by a key 107. It will be noted that these keys are spaced so far apart upon the instrument that the operator will require both hands to operate the keys, thereby preventing him from coming in contact with the dial to which the high breakdown voltage is applied.

The proper adjustment of the dial requires that when the dialing wheel is rotated $\frac{3}{32}$ of an inch measured along its periphery, the shunt switch 59 shall remain inoperative, but when the dialing wheel has rotated $\frac{7}{32}$ of an inch, the shunt switch 59 shall have been operated. In order to determine whether the adjustment of the dial is within these limits, a switch 108 is operated, again closing the circuit through the clamping magnet 66 from the battery 65, switch 64, switch 108 to ground 109. A circuit will also be established from the battery 84 through the retarded relay 85, to switch 108 and ground 109, causing the relay 85 to operate, which again establishes a circuit through the rotating magnets 83 from the battery 89, through relay 86, switch 80, relay 85, switch 108 to ground 109. Simultaneously with the operation of the retarded relay 85, a circuit is established through the electromagnet 99 from battery 98, switch 64, retarded relay 85, switch 108 to ground 81, causing the electromagnet 99 to move the plunger 103 into slot 109 of the toothed plate 104. The dialing wheel rotating mechanism is not permitted to rotate very far in this instance due to the fact that the plunger 103 engages the slot 109 of the plate 104. By opening the switch 80 the circuit through the rotating magnets 83 will be interrupted, allowing the dialing wheel rotating mechanism to drop back until the other side of the slot 109 engages the plunger 103. The slot 109 and the portion of the plunger engaging the slot are of such dimensions that when one side of the slot engages the plunger the dialing wheel will have been rotated $\frac{7}{32}$ of an inch, and when the other side of the slot engages the plunger 103, the dialing wheel rotating mechanism will have fallen back to a position $\frac{3}{32}$ of an inch from its inoperative position. When the switch 108 is operated, as in this test, there will be a circuit established from the battery 113, through a signal lamp 114, switch 108, shunt switch 59, back to switch 108 to ground 109 whenever the shunt switch 59 is in its normal position. If the dial is therefore properly adjusted, the lamp 114 should be illuminated when the switch 80 is open in which case the dialing wheel is rotated $\frac{7}{32}$ of an inch and extinguished when the switch 88 is closed and the dialing wheel is rotated $\frac{3}{32}$ of an inch. The switches 108 and 80 may be operated by a single key 90.

The dial should be so adjusted that the ratio of the impulses to the intervals between impulses is within predetermined limits. In the particular type of dial illustrated, the impulse should be from 34.9 to 38.1% and the interval between impulses should be within 65.1 to 61.9%, respectively, of the total period. In order to make the test to determine the ratio of the impulse to the period between impulses, the dial is left in the dial holding device where it was placed in the previous test and the switch 115 is operated. The operator then places his finger in the last aperture of the dialing wheel 75 and rotates it until his finger strikes the stop on the dial, rotating the dialing wheel the maximum amount. During this operation the pawl 13 reciprocates a slight amount, but it should not move so far as to open the impulse key 58. If the dial is not properly adjusted the pawl may open the impulse key 58, giving a signal in a lamp 116. This is due to the fact that when the switch 115 is operated a circuit is established from the battery 117 through transformer 118, switch 115, impulse key 58, and back through switch 115 to ground 119. Should the pawl 13 therefore move too far in rotating the dial, the impulse key 58 will be operated, interrupting the constant current through the transformer 118 and thereby causing a signal in the lamp 116. The lamp 116 is shown as a neon lamp which is sensitive to extremely brief and also weak current impulses. If there is no signal in the lamp 116 it is an indication that the pawl does not reciprocate too far during the rotation of the dial and the dial may therefore be released for the purpose of testing the ratio of the impulses to the intervals between the impulses. The release of the dialing wheel 75 from its maximum rotation causes the pawl 13 to operate the impulse key 58 ten times. It will be noted that before the first opening of the impulse key 58 there is a circuit from battery 123 through coil 124, switch 63, switch 115, impulse key 58, contact 53, back to switch 115 to ground 119. A similar circuit leads from battery 125 through coil 126, meeting the previously traced circuit prior to entering switch 63 from where the circuits traverse the same conductor to ground 119. The energization of coils 124 and 126 retains the reciprocating contact members 127 and 128, respectively 17, closed on their left hand contacts. At the same time battery 123 energizes a coil 129 and a battery 133 energizes the coil 34 through resistance element 135. Coils 124 and 126 are, however, so arranged that when they are energized they will overcome the effect of coils 129 and 134, respectively, holding the reciprocating members 127 and 128 in their left hand position as long as the coils 124 and 126 are energized, but allowing coils 129 and 134 to become effective when the coils 124 and 126 are deenergized.

As a result of the operating of the switch 115 at the beginning of this test, a circuit is also established from battery 136 to switch 115 and ground 119, energizing relay 137, causing its operation and thereby establishing a circuit from battery 138, through relay 139, through a normally closed contact of relay 143 to a contact of switch 63, switch 146, switch 115, impulse key 58, back to switch 115 and ground 119. The energization of relay 139 will cause it to close its contact, but this will not result in the operation of relay 143 because the circuit through relay 139 is grounded through the impulse key 119, as pointed out above. However, as soon as the impulse key is operated the first time the ground 119 will be removed and the current will flow from relay 139 through relay 143 to ground 148. The opening of the impulse key 58 will also interrupt the circuits through coils 124 and 126, allowing the reciprocating members 127 and 128 to move to their right hand contacts, allowing a battery 149, which is connected directly to the reciprocating member 127 and through switch 63 to the reciprocating member 128, to charge a pair of condensers 153 and 154 during the time that the circuit through the impulse key is interrupted.

A variable resistance element 156 may be placed in series with the battery 149 to compensate for variations in the internal resistance of the battery due to aging. When the impulse key is now closed, the coils 124 and 126 will be reenergized, causing the reciprocating members to again engage their left hand contacts. The relay 143 having been operated during the interim, the left hand contact of reciprocating member 127 is now connected through relay 143 and the normally closed contact of relay 145 to a condenser 157, and the reciprocating member 128 is connected through its left hand contact switch 63, relay 143, relay 155 to a condenser 158, allowing the battery 149 to charge condensers 157 and 158 during the time that the impulse key is closed. It is a characteristic of a condenser that the charge placed thereon is proportional to the time of charging and the charging voltage. If, therefore, the charging voltage is made constant, the charge upon the condenser will be directly proportional to the time of charging. This is true only until the condenser has attained its maximum charge for the impressed voltage and a resistance is therefore placed in series with each of the condensers and the condensers are made of such capacity that they will not normally attain a maximum charge from the battery 149. Since the impulse key is closed only from 34.9 to 38.1% of the total impulse period, resistances 163 and 164 in series with the condensers 153 and 154 which are charged during the period between impulses are made larger than resistances 165 and 166 in series with the condensers 157 and 158 which are charged during the impulse period. It has been found impractical in practice to adjust the dials so that the percentage of impulse to interval will have a definite value and the dials are therefore adjusted to a percentage within predetermined limits. For this reason, two condensers are provided to be charged during an impulse and the resistance in series with one of the condensers is made slightly different than the resistance in series with the other, and similarly the resistances in series with the condensers which are charged during the interval are made slightly different, so that one of the condensers charged during an impulse compared to one of the condensers charged during an interval will indicate a maximum percentage of impulse, and a comparison of the other condensers will indicate a minimum percentage of impulse.

Assuming now that the first complete impulse period has passed, the relay 167 is energized from battery 138 through a normally closed contact of relay 168 and the impulse key to ground over the same circuit that the relay 139 was grounded prior to the first impulse. The relay 168 will not be energized on account of the ground through the impulse key. As soon, however, as the impulse key is again opened, relay 168 will be energized by current through coil 167, relay 168 to ground 148. In this manner a set of relays, similar to 167 and 168, will be operated in response to each impulse. Seven sets of relays similar to 167 and 168 have been omitted from the drawing because they are identical with relays 167 and 168 and only the first, second and tenth sets of relays have been shown. Upon the tenth impulse, relay 155 will be operated, disconnecting the reciprocating members 127 and 128 from the condensers 157 and 158 and simultaneously with the operation of the last relay 155 a signal lamp 169 will be illuminated from battery 59, the current from which passes through a contact closed by relay 155 to ground. A relay 174 will also be operated by a battery 173, the current from which after leaving the relay traverses the same path as the current from battery 159.

The condensers are now charged and are ready to be connected with galvanometers or indicating devices 175 and 176. As shown in Fig. 1, the pointers of these indicating devices are arranged to point to adjacent graduations on a single chart 177. In order to connect the indicating devices with the condensers, a switch 178 is operated, connecting condensers 153 and 157 with the indicating device 176, and connecting the condensers 154 and 158 to the indicating device 175. The switches 115 and 178 may be operated by a single key 180. If the charges on the condensers 153 and 157 are equal, there will be no indication in the galvanometer 176. The resistances in series with these condensers are, however, so arranged that the charges on the condensers will be equal only when the impulses have a maximum duration. When the intervals have a duration less than their maximum limit, the upper pointer on the chart 177 which corresponds to the pointer of indicating device 176 will move downwardly. The resistances in series with condensers 154 and 158 are so chosen that the charges on the condensers will be equal when the intervals have a minimum duration, and for any duration longer than the minimum duration there will be an upward movement of the lower pointer on chart 177 which corresponds to the pointer of indicating device 175. It will be seen from this that when the duration of the intervals is above the maximum value, both pointers on the chart 177 will move upwardly, and when the duration of the intervals is under the maximum limit, both pointers will move in a downward direction. When, however, the ratio of the impulses to the intervals is within the proper limits, the pointers will move toward each other. This completes the test to determine whether the adjustment of the dial is such as to produce a proper ratio of impulse to intervals between impulses.

The charges on the condensers are now equalized, that is, the charges on the condensers 153 and 157 are equalized and the charges on condensers 154 and 158 are equalized and these charges are utilized to determine whether the frequency of the impulses falls within predetermined limits. Since the ratio of the impulses to the intervals have been found to be proper before the frequency test is made, it will be seen that the value of the charges on the condensers is a measure of the frequency of the impulses. The determination of the value of the charges is made by connecting the condensers 153 and 157 across potentiometer elements 183 and 184 which are supplied with electrical energy from the battery 149, the circuit passing from one terminal of the battery 149 to the variable resistance 156, to one terminal of the potentiometer elements 183 and 184, and from the other terminal of the battery 149 through switch 115, and to the other terminal of the potentiometer elements 183 and 184. It will be noted that upon the first operation of the switch 178 in the ratio test a circuit was established from battery 185 through relay 186, through a normally closed contact of relay 187 to ground 193, causing the operation of relay 186 to close its contact and connect it through switch 115 to ground 119. Relay 187 will not be energized as a result of the energization of relay 186 because the current coming from relay 186 does not pass through coil 188 of relay 187 but passes to the ground 193. The switch 178 is now opened and immediately closed again for the frequency test. When the switch 178 is open, ground 193 will be removed, allowing the current coming from relay 186 to flow through coil 188 to ground 119, operating the relay 187 and establishing upon the second operation of switch 178 a locking circuit from battery 194 through coil 189 of relay 187 to ground 193.

The operation of the relay 187 deenergizes relay 186 by shunting the current from battery 185 through the contacts of relay 187 to ground 193. The operation of relay 187 also establishes a circuit from battery 195 through relay 196, relay 187 to ground 193. The operation of the relay 196 places the condensers 153 and 157 in parallel connection with one terminal of the indicating device 176 and the other terminal of the indicating device is connected through relay 196 to the potentiometer element 183. If the charges on the condensers correspond to the maximum frequency limit they will be equal to the potential of the subtended portion of the potentiometer element 183 and there will be no deflection in the indicating device. If the frequency, however, is less than the predetermined maximum there will be a downward deflection of the pointer of the indicating device 176 on the indicating chart 177. The condensers 154 and 158 are similarly connected to a portion of the potentiometer element 184 and there will be no deflection of the indicating device 175 if the charges on the condensers corespond to the minimum frequency limit, but if the charges correspond to a value greater than the minimum frequency limit, there will be an upward movement of the pointer of the indicating device 175 on the chart 177. If, therefore, the pointers move toward each other in the frequency test it is an indication that the frequency of the impulses is within proper limits.

In case it is desired to make only the frequency test, the switch 146 may be operated which has the same effect as the operation of switch 115 except that the circuit established from battery 136 leads through relay 137 to ground 144 instead of to ground 119. The dial is then operated, but instead of operating the switch 178 following the operation of the dial, the switch 147 is operated, connecting battery 195 through relay 196 directly to ground 197, causing the operation of relay 196 to immediately indicate frequency in the frequency indicating devices 175 and 176. The switches 146 and 147 may be operated in sequence by a single key 150. Following the frequency test the circuit through relay 137 is broken by the return of switches 115 and 146 to their normal positions, removing either the ground 119 or 144 as the case may be. The closing of those contacts of relay 137 which are closed in the inoperative position causes a short-circuit across all of the condensers, allowing them to discharge to place them in readiness for a subsequent test.

A special type of relay may be used for alternately connecting the battery 149 to the different condensers. Such a relay is illustrated in Fig. 9 in which a pair of poles 203 of permeable material are attached to a permanent magnet 204. A reciprocating member 205 is pivotally supported in a support of non-magnetic material 206 between the poles 203 and a pair of coils 207 and 208 are supported between the poles, one of which corresponds to coil 124 or 126, the other of which corresponds to coil 129 or coil 134. In this relay the poles 203 are magnetized by the permanent magnet 204 so that a change in the polarity of the reciprocating member 205 will exert a strong force to move the reciprocating member, resulting in a very rapid movement thereof. In practice it has been found that such a relay will follow a thousand cycle current and the time of movement in either direction is extremely uniform.

The adjustment of the dial in regard to the sequence of operation of the key 58 and the shunt switch 59 should be such that the shunt switch will operate before the impulse key is operated and remain in its operated position until the impulse key has returned to its normal position at which time the shunt switch should return to its normal position. In order to determine whether the above sequence obtains, the switch 63 is operated, connecting battery 209 to relay 139, normally closed contact of relay 143 back through switch 63, contact 55 of the dial to shunt switch 59. The shunt switch is at this time in its normal position and therefore the circuit is not further completed at this time. Immediately after operating the switch 63 the switch 64 is operated, both of which may be operated by a single key 60, establishing a circuit from battery 65 through clamping magnet 66, switch 64 to ground 213. The retarded relay 85 is also energized from battery 84 by operating the switch 64 and establishing the ground 213, resulting in establishing a circuit through the rotating magnets 83 to rotate the dial until the shoulder of the armature 79 strikes the switch 94 and closes it, energizing relay 86 to demagnetize the rotating magnets and establish a locking circuit through its coil 88. Upon the demagnetization of the rotating magnets, the dialing wheel rotating mechanism returns to its normal position since the plunger actuating magnet 99 is not energized upon the operation of switch 64. At the beginning of the rotation of the dialing wheel just described the shunt switch 59 should operate before the impulse key 58 is operated. When the shunt switch operates before the impulse key is operated, the previously described circuit from battery 209 is completed through the impulse key to contact 53 of the dial switch 63 to ground 214, energizing relay 139, but relay 143 will not be operated since the current flowing through relay 139 passes to ground 214. If the impulse key is now operated, the ground at 214 will be removed and the relay 143 will be energized by the current from relay 139 flowing to ground 148, causing the operation of relay 143. The operation of relay 143 connects battery 125 through coil 126, switch 63, relay 143, back through switch 63 to the shunt switch 59. From here on the circuit to ground 214 depends upon whether the impulse key is returned to normal before the shunt switch is removed from its operative contact. If the impulse key and the shunt switch have the proper sequence the circuit will be completed, energizing relay 126 to close reciprocating member 128 on its left hand contact from which it was removed by the constant energization of coil 134 during the deenergization of coil 126. The contacting of the reciprocating member 128 with its left hand contact causes the illumination of a signal lamp 216 which is energized by a battery 215, the current from which flows through the signal lamp to the switch 63, reciprocating member 128 to ground 214, indicating the proper sequence of operation of the shunt switch and the impulse key. In order to decrease the magnetization of coil 134 and increase the effectiveness of coil 126 during this test, a portion of the resistance element 135 is short circuited by the operation of switch 63.

It will be understood that the embodiment of the invention herein described and illustrated is merely a convenient and useful form of the invention which is capable of many other modifications without departing from the spirit and scope of the invention.

What is claimed is:

1. In a system for testing a dial, means for clamping the dial operative in response to a movement of the dial, and means for causing a release of said clamping means upon a second movement of the dial.

2. In a system for testing a dial, a dial holding fixture, a clamp for retaining the dial in the fixture, a switch operable by the dial for causing the actuation of the clamp, and means responsive to a second operation of said switch by the dial to release the clamping means.

3. In a system for testing a dial, clamping means for holding a dial in position, a switch operable to cause the actuation of the clamping means, and means responsive to a second operation of said switch to release the clamping means.

4. In a system for testing a dial provided with a shunt switch, means for actuating the dial a predetermined amount, and means for thereupon determining the position of the shunt switch.

5. In a testing system, means for operatively associating the device under test with testing apparatus, means operated thereafter for predeterminedly rotating the device, and means for indicating the results of the tests made during the rotation of the device.

6. In a system for testing a dial provided with a shunt switch, means for actuating the dial within predetermined limits, and means for determining the position of the shunt switch at each of said limits.

7. In a system for testing a dial provided with a shunt switch operated by a dialing wheel, a clamp for engaging the dialing wheels, means for rotating the clamp to rotate the dialing wheel, means for limiting said rotation between predetermined limits, and means for determining the position of the shunt switch at said limits.

8. In a system for testing a dial provided with a shunt switch operated by a dialing wheel, a clamp for engaging the dialing wheel, means for rotating the clamp to rotate the dialing wheel, means operative to cause the rotation of the clamp subsequent to its engagement with the dialing wheel, means for limiting the rotation between predetermined limits, and means for determining the position of the shunt switch at said limits.

9. In a system for testing the sequence of operation of the shunt switch and impulse key of a dial upon actuating the dialing wheel, means for actuating the dialing wheel causing the operation of the shunt switch and the impulse key, and means for determining the sequence of operation.

10. In a system for testing the sequence of operation of the shunt switch and impulse key of a dial upon actuating the dialing wheel, means for holding the dial, a clamp for engaging the dialing wheel, means for rotating the clamp to actuate the dialing wheel, and means for indicating the sequence of the shunt switch and the impulse key upon actuation of the dialing wheel.

11. In a system for testing the sequence of operation of the shunt switch and impulse key of a dial, means for causing the operation of the shunt switch and the impulse key in accordance with their adjustment, and means for determining the sequence of operation which is dependent upon the adjustment.

12. In a system for testing an interrupting device, a testing circuit including a plurality of condensers, means for charging one of the condensers during electrical impulses, means for charging another of the condensers during intervals between impulses, and means responsive to the condenser charges for indicating the relative duration of the impulses and intervals.

13. In a testing apparatus, a testing circuit including a plurality of condensers, means for charging one of the condensers during impulses, means for charging another of the condensers during intervals between impulses, a plurality of relays one of which is actuated in response to each impulse, means responsive to the last relay for interrupting the charging of the condensers, and means responsive to the charges on the condensers for indicating the ratio between impulses and intervals.

14. In a system for testing the relation of impulses to intervals produced by an interrupting device, a testing circuit including a pair of condensers, a source of energy, a relay for connecting the source of energy to one of the condensers during an impulse and to the other condenser during an interval and means for indicating the difference between the electrical charges of the condensers.

15. In a system for testing the relation of impulses to intervals produced by an interrupting device, a testing circuit including a pair of condensers, a resistance in series with each of the condensers, said resistances having such a relative value that the charges on the condensers will be equal upon a predetermined relation of impulses to intervals, a source of energy, a relay for connecting the source of energy to one of the condensers through one of said resistances during an impulse and to the second condenser through the other resistance during an interval, and means for indicating the difference between the electrical charges of the condensers.

16. In an apparatus for determining the frequency of impulses, a testing circuit including a condenser for receiving a charge during impulses, a condenser for receiving a charge during intervals between impulses, a plurality of relays one of which is actuated in response to each impulse, means for preparing an indicating circuit upon the actuation of the last relay, and means in the indicating circuit responsive to the charges on the condensers for indicating the frequency of the impulses.

17. In a testing apparatus, a testing circuit including a pair of condensers for receiving charges during impulses, a resistance element in series with each of said condensers, one of which resistance elements has a different resistance than the other, a pair of condensers for receiving charges during the interval between impulses, a resistance in series with each of said last-mentioned condensers, one of which resistance elements has a different resistance than the other, means responsive to the ratio of the charges on the condensers for indicating the ratio between impulses and intervals, and means responsive to the amount of said charges for indicating the frequency of the impulses.

18. In a testing apparatus, a testing circuit including a condenser adapted to be charged during an impulse, a second condenser adapted to be charged during an interval between impulses, a source of energy for charging said condensers means for connecting said source to the first condenser during an impulse and to the second condenser during an interval between impulses, and means for indicating the difference between the electrical charges of the condensers.

19. In a testing apparatus, a testing circuit including a condenser adapted to be charged during an impulse, a second condenser adapted to be charged during an interval between impulses, a source of energy for charging the condensers, means for connecting said source first to the one condenser and then to the other, and a plurality of relays corresponding to the number of impulses to be measured for disconnecting said source of energy after a predetermined number of impulses.

20. In a system for determining the frequency of impulses caused by an interrupting device, a testing circuit including a condenser adapted to be charged during an impulse period, a potentiometer for establishing a comparative voltage, and means for comparing the potentiometer voltage with the charge on the condenser to determine the frequency of the impulses.

In witness whereof, we hereunto subscribe our names this 24th day of May, A. D. 1928.

RAYMOND WICKLUND BROWN.
CHRISTIAN PAULSON.